(12) United States Patent
Littau et al.

(10) Patent No.: US 6,336,605 B1
(45) Date of Patent: Jan. 8, 2002

(54) SELF POSITIONING ADJUSTABLE BRAKE FOR BAITCAST REEL

(75) Inventors: Christopher S. Littau, Bartlesville; Hyunkyu Kim, Broken Arrow, both of OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/459,317

(22) Filed: Dec. 10, 1999

(51) Int. Cl.[7] .......................................... A01K 89/0155
(52) U.S. Cl. ........................ 242/289; 242/286; 74/10.41
(58) Field of Search ............................ 74/10.41; 242/289

(56) References Cited

U.S. PATENT DOCUMENTS

| | | | |
|---|---|---|---|
| 2,531,246 A | * 11/1950 | Batcheller | 74/10.41 |
| 3,929,093 A | * 12/1975 | Ikeda | 74/10.41 |
| 3,972,241 A | * 8/1976 | Valdettaro | 74/10.41 |
| 4,142,694 A | 3/1979 | Rankin | |
| 4,830,308 A | 5/1989 | Puryear | |
| 4,943,012 A | 7/1990 | Aoki | |
| 5,273,235 A | 12/1993 | Sato | |
| 5,374,002 A | 12/1994 | Sato | |
| 5,489,070 A | 2/1996 | Puryear et al. | |
| 5,897,069 A | 4/1999 | Brown et al. | |
| 5,950,949 A | * 9/1999 | Cockerham | 242/289 |
| 5,984,221 A | * 11/1999 | Kim | 242/289 |
| 6,003,798 A | * 12/1999 | Kim | 242/289 |

* cited by examiner

Primary Examiner—Katherine A. Matecki
(74) Attorney, Agent, or Firm—Fellers, Snider, Blankenship, Bailey & Tippens

(57) ABSTRACT

A braking apparatus for a fishing reel comprising: a side cover; a brake dial rotatably positioned in the side cover such that the brake dial is externally accessible and operable from outside of the side cover, the brake dial having a plurality of predetermined positions; at least one cam lobe provided on either the brake dial or the side cover; and a V-spring operably attached to the other of the brake dial or the side cover for interaction with the cam lobe such that, when the V-spring is positioned against a portion of the cam lobe and the brake dial is not located in one of its predetermined positions, the V-spring will act against the portion of the cam lobe to urge the brake dial to rotate to one of the predetermined positions.

9 Claims, 9 Drawing Sheets

SELF POSITIONING ADJUSTABLE BRAKE FOR BAITCAST REEL

BACKGROUND OF THE INVENTION

1. Field of the Invention

This invention relates generally to braking systems for fishing reels. More particularly, but not by way of limitation, the present invention relates to adjustable braking systems for baitcast fishing reels.

2. Background

Baitcast fishing reels are well known in the art. A baitcasting reel will typically comprise: a split frame having a pair of opposing side plates; a foot extending from the frame for attaching the reel to a fishing rod; a line spool, rotatably positioned between the frame side plates, for retrieving and holding a fishing line; a spool shaft, on which the spool is secured, having ends extending through the frame side plates; a pinion gear (typically a helical gear) provided on the spool shaft; a manually rotatable crank handle; a gear train and crankshaft assembly mechanically linking the crank handle to the spool shaft pinion gear; a level-wind mechanism which transverses the spool during winding to ensure that the fishing line is properly wound along the length of the spool; a clutch mechanism for preventing reverse rotation of the crank handle; an exterior actuator (typically a thumb lever) for disengaging the pinion gear from the spool shaft to allow the spool to rotate freely during casting; and a spool drag or spool braking mechanism.

In most cases, right and left side covers are removably attached to the frame side plates for housing the reel's various operating mechanisms. A right-handed baitcasting reel (i.e., a reel designed for a right-handed user) will typically be structured such that: the spool drag or spool braking mechanism is housed under the left side cover; the crank handle is rotatably mounted outside of the right side cover; and the crankshaft, gear train, pinion gear, clutch, and anti-reverse mechanism are housed under the right side cover. As will be understood by those skilled in the art, a left-handed version of generally any baitcasting reel can be produced by simply reversing the arrangement and structure of the reel's components such that the left-handed reel is a mirror image of the right-handed version of the reel.

Spool drag or spool braking systems are commonly used in baitcasting reels to alleviate line backlashing (also referred to as "line nesting") problems. Because they utilize transversely-oriented spools which rotate during casting, baitcasting reels are more prone to backlashing problems than are spinning reels and spin casting reels. Such problems result primarily from the rotational momentum carried by the spool during casting. The most common types of drag/braking mechanisms used in baitcasting reels are magnetic drag brakes and centrifugal (friction) braking systems.

Many environmental factors, as well as personal preferences, affect the amount of braking force which may be appropriate for a given cast. This has led to the development of adjustable braking systems for baitcasting reels. For example, U.S. Pat. No. 5,108,042 discloses an adjustable, magnetic drag mechanism which exerts a magnetic drag force on the end of the reel spool. The magnetic force slows rotation of the spool during casting. The U.S. Pat. No. 5,108,042 mechanism comprises: a magnet carrier ring having a plurality of magnets attached thereto; an axially movable cam disc to which the magnet carrier ring is secured; and an adjustment dial projecting through a recess in the left cover. The dial includes cams which are operably associated with the cam disc for selectively moving the carrier ring toward and away from the end of the spool in order to adjust the amount of magnetic drag force applied to the spool.

U.S. Pat. No. 5,950,949 discloses a centrifugal braking system wherein the braking force exerted by the system can be selectively adjusted. Like the magnetic system of U.S. Pat. No. 5,108,042, the centrifugal braking system of U.S. Pat. No. 5,950,949 employs an externally adjustable brake dial having a plurality of smooth cam ramps provided thereon. In the centrifugal braking system of U.S. Pat. No. 5,950,949, the cam ramps provided on the brake dial convert rotary movement of the dial into axial movement of a brake ring to thereby selectively adjust the number of braking pieces which can contact the brake ring.

Each of the smooth dial cam systems of U.S. Pat. Nos. 5,108,042 and 5,950,949 provides an almost infinite number of possible braking positions within the available rotational range of the dial. Thus, such systems can provide a high degree of adjustability. However, they can also require significant experimentation both to identify preferred braking positions and to relocate such positions when making desired adjustments. Additionally, when used in centrifugal braking devices of the type disclosed in U.S. Pat. No. 5,950,949, such systems do not ensure that the braking surface is always properly positioned such that the brake elements are prevented from rubbing and/or binding against the leading edge of the brake ring.

It is thus an object of the present invention to provide an adjustable braking system for a baitcast fishing reel which includes a self positioning adjustment mechanism to provide an appropriate number of discrete braking positions to accommodate the majority of operating environments.

It is a further object of the invention to provide an adjustable braking system whereby a fisherman can easily return to a previous braking position.

It is a further object of the present invention to provide smooth, fluid movement between the discrete braking positions.

It is also an object of the present invention to ensure that, when employed in a centrifugal braking system, the braking surface is always properly positioned in desired braking positions such that the brake elements do not rub and/or bind against the leading edge of the braking surface.

SUMMARY OF THE INVENTION

The present invention provides a fishing reel braking apparatus which satisfies the needs and alleviates the problems discussed above. The inventive apparatus preferably comprises: a side cover; a brake dial rotatably positioned in the side cover such that the brake dial is externally accessible and operable from outside of the side cover, the brake dial having a plurality of predetermined positions; at least one cam lobe provided on either the brake dial or the side cover; and a V-spring operably attached to the other of the brake dial or the side cover for interaction with the cam lobe such that, when the V-spring is positioned against a portion of the cam lobe and the brake dial is not located in one of its predetermined positions, the V-spring will act against the portion of the cam lobe to urge the brake dial to rotate to one of the predetermined positions.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENT

Figure 1:
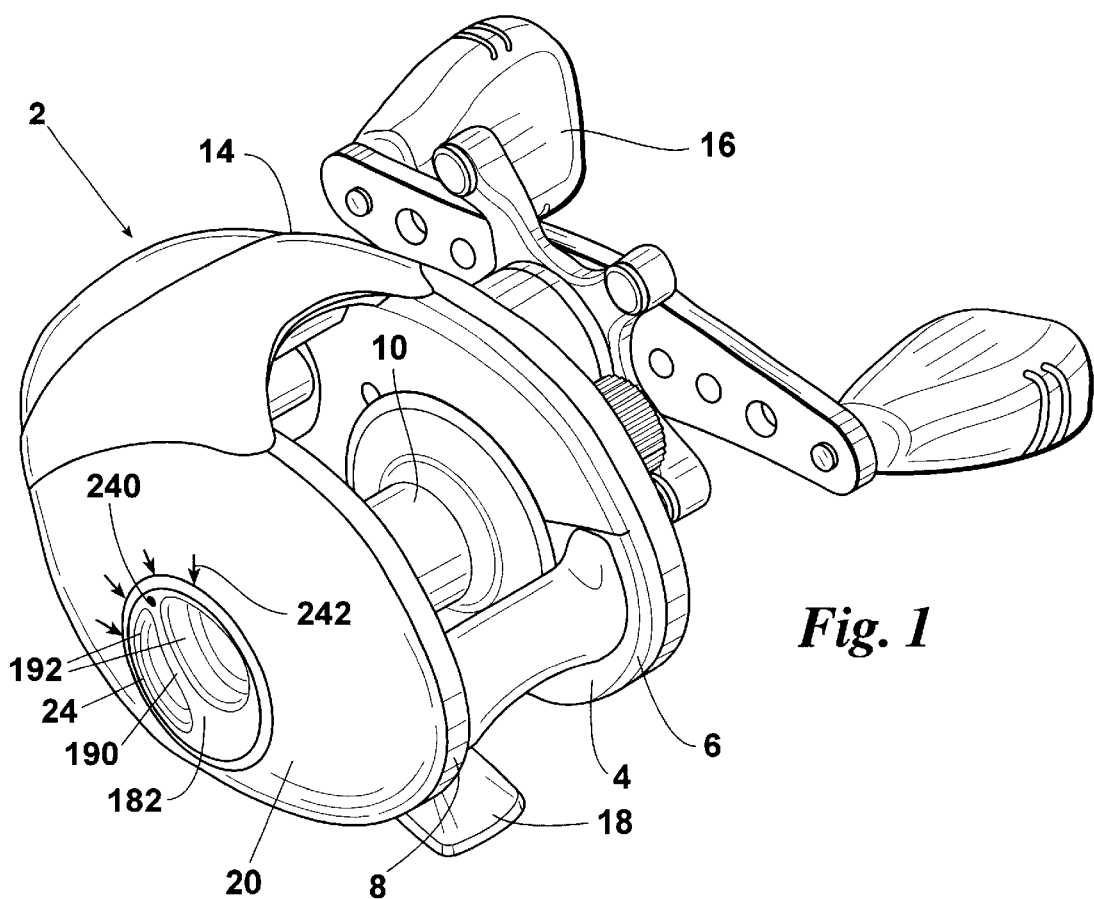
FIG. 1 provides a perspective view of a baitcasting reel 2 having the adjustable self positioning braking apparatus incorporated therein.
Figure 2:
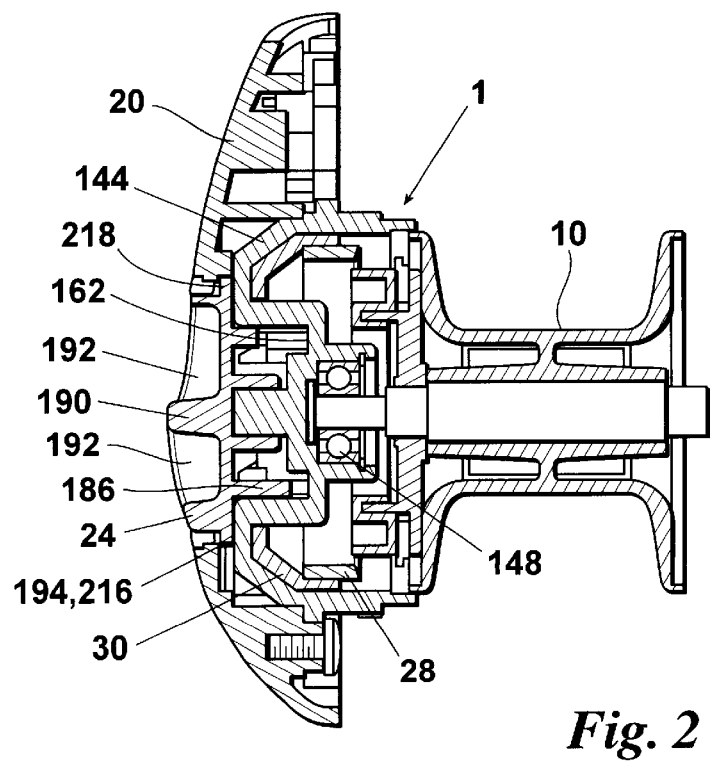
FIG. 2 provides a cutaway view of the left side assembly of baitcasting reel 2.
Figure 3:
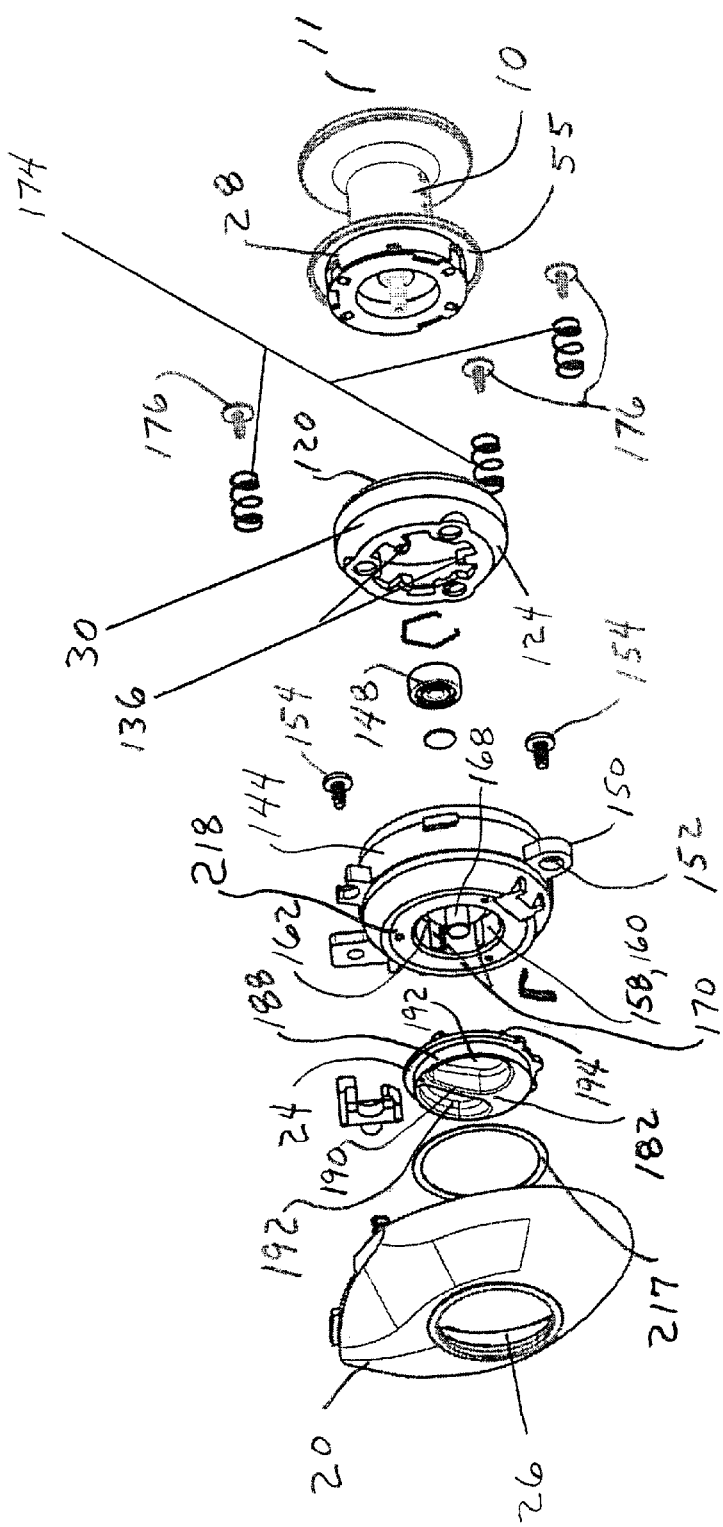
FIG. 3 provides an exploded perspective view of the left side assembly of reel 2.

An embodiment 1 of the inventive, adjustable braking apparatus (as incorporated in a baitcasting reel 2) is shown in FIGS. 1–16. Baitcasting reel 2 comprises: a split frame 4 having a right side plate 6 and a left side plate 8; a line spool 10 rotatably mounted in frame 4 between side plates 6 and 8; a spool shaft 11 extending through spool 10; a right side cover 14 secured over side plate 6; a crank handle 16, operably extending from right cover 14, for rotating spool 10; a reel foot 18, provided on the bottom of frame 4, for attaching reel 2 to a fishing rod; and a left side cover 20 secured over left side plate 8. When reel 2 is assembled, the brake dial 24 of inventive brake apparatus 1 projects through a circular aperture 26 formed in left cover 20.

Although for convenience, the inventive apparatus is shown herein and described as incorporated in a right-handed baitcasting reel, the inventive apparatus is equally adaptable for use in left-handed reels. As will be understood by those skilled in the art, a left-handed version of generally any baitcasting reel can be produced by simply reversing the arrangement and structure of the reel's components such that the left-handed reel is a mirror image of the right-handed version of the reel.

Inventive braking apparatus 1 preferably comprises: inventive brake dial 24; a braking element assembly 28; and a brake ring assembly 30. Brake element assembly 28 preferably comprises: a plurality of brake elements 34; a brake element housing 36; and a housing cover 38. Each of brake elements 34 is preferably a T-shaped structure as depicted in FIGS. 9–12. Brake element housing 36 is preferably a substantially cylindrical member having: a longitudinal axis of rotation 54; a forward longitudinal end 56; a rearward longitudinal end 58; a cylindrical outer wall 60; and a plurality of T-shaped radial slots 68a, 68b, 68c, 68d, 68e, and 68f for slidably holding brake elements 34.

Each of slots 68a–f has a depth defined by the distance from forward radial shoulder 66 to the slot's bottom surface 80. Slots 68a–f are preferably evenly spaced around housing 36 and are preferably configured such that (a) slot 68a is diametrically opposed to, and of equal depth with, slot 68b, (b) slot 68c is diametrically opposed to, and of equal depth with, slot 68d, (c) slot 68e is diametrically opposed to, and of equal depth with, slot 68f, (d) the depth of slots 68c and 68d exceeds the depth of slots 68a and 68b, and (e) the depth of slots 68e and 68f exceeds the depth of slots 68c and 68d. As explained hereinbelow, the differing depths of slot 68a–f desirably allow a wide range of specific brake settings.

Housing cover 38 preferably includes a first pair of identical, diametrically opposed, rearwardly extending bosses 102 and a second pair of identical, diametrically opposed, rearwardly extending bosses 104. Bosses 102 preferably have a size and shape corresponding to that of the forward cavities 92 of housing slots 68c and 68d. Bosses 104 preferably have a size and shape corresponding to the forward cavities 92 of housing slots 68e and 68f. Thus, housing cover 38 operably retains brake elements 34 in the T-shaped portions 78 of housing slots 68a–f.

As used herein, the terms "forward" and "forwardly facing" describe features facing and/or positioned away from end 55 of line spool 10. The terms "rearward" and "rearwardly facing", on the other hand, describe features facing and/or positioned toward end 55.

Brake element assembly 28 is secured in reel 2 such that assembly 28 rotates with spool 10. A splined passage 64 provided through housing 36 is received over an externally splined portion 109 of spool shaft 11. When secured in this manner, the rotational axis 54 of brake element assembly 28 is collinear with the rotational axis of spool 10.

When brake element assembly 28 rotates with spool shaft 11, the resulting centrifugal force urges elements 34 to slide radially outward in slots 68 away from axis 54. Brake elements 34 are sized such that, at least when elements 34 slide into their outermost radial positions, the brake pads 48 of brake elements 34 project from housing 36 through the slot openings 76 formed in outer wall 60.

Brake ring assembly 30 comprises: a brake ring 120 having an interior cylindrical braking surface 122; and a collar 124 for holding and carrying brake ring 120. As will be understood by those skilled in the art, brake ring assembly 30 could be replaced with a unitary structure wherein, for example, a cylindrical braking surface is integrally formed in collar 124.

Collar 124 comprises: a body 126 having a substantially cylindrical rearward portion 125 and an inwardly tapered forward longitudinal end portion 127; a cylindrical bore 128, formed in the rearward portion 125, wherein brake ring 120 is press fit or otherwise retained; a flat inwardly extending, forward end wall 130; a plurality of (preferably three) cylindrical bores 132 extending through, and evenly spaced around, end wall 130; a large central aperture 134 extending through end wall 130; and a plurality of (preferably three) interacting structures 136 provided at the forward longitudinal end of body 126.

Interacting structures 136 project radially into, and are evenly spaced about, central aperture 134. Each interacting structure 136 preferably comprises: an arm 138 which extends radially into central aperture 134 from forward end wall 130; and a rounded boss 140 projecting forwardly from the distal end portion of lateral arm 138.

As is commonly the case with baitcasting reels, reel 2 includes an interior spool cover 144 comprising: a cylindrical interior cavity 146 for holding a spool shaft bearing or bushing 148; a plurality of (preferably two) radially projecting ears 150; apertures 152 provided through radial ears 150; and a radially projecting, partial ear structure 151 having a semicircular notch 153 formed in the outer end thereof. Apertures 152 and notch 153 are sized and positioned to receive internally-threaded bosses 156, provided in the interior of side cover 20, such that spool cover 144 can be secured to side cover 20 by means of bolts or screws 154.

In the inventive apparatus, spool cover 144 is preferably modified to include: a cylindrical cavity 158 provided in the forward face of spool cover 144; a substantially cylindrical interior wall 160 provided in cylindrical cavity 158; a radial wall 162 provided at the interior end of cylindrical cavity 158; a cylindrical guide post 168 projecting forwardly from the center of cylindrical cavity 158; and a plurality of slots 170 provided through interior end wall 162 and extending longitudinally into the cylindrical wall 160 of cavity 158. The number of longitudinal slots 170 provided in spool cover 144 corresponds to the number of intersecting structures 136 provided at the forward end of brake collar 124. Longitudinal slots 170 are sized and spaced such that interacting structures 136 are received in slots 170 for reciprocating forward and rearward movement with respect to spool cover 144.

Spool cover 144 also includes a plurality of rearwardly projecting, internally threaded bosses 172 which are sized and spaced for receipt through the forward bores 132 of brake collar 124 such that collar 124 can slide forwardly and rearwardly on bosses 172. With bosses 172 received through bores 132, springs 174 are positioned around bosses 172 and are held in place by means of bolts or screws 176. Springs 174 exert a continuous, biasing force against the forward end wall 130 of brake collar 124 and thus continuously act to urge collar 124 forwardly within spool cover 144.

As best seen in FIGS. 1, 3, 4, and 16, braking dial 24 preferably comprises: a circular dial plate 180; a grasping structure 182 provided on the forward face of dial plate 180; a cylindrical cup 184 extending from the center of the rearward face of dial plate 180 and sized for rotatably receiving cylindrical guide post 168; three curved cams 186 projecting from the rearward face of dial plate 180; and three rounded cam lobes 196, 198, and 200 provided on the outer edge of dial plate 180.

Cams 186 are arranged in a circular pattern around cylindrical cup 184. Cams 186 are receivable in the forward, cylindrical cavity 158 of spool cover 144 for rotational movement adjacent to cylindrical interior wall 160. Cams 186 interact with interacting structures 136 to thereby selectively move brake ring assembly 30 through a series of braking positions.

Grasping structure 182 projects forwardly from the forward face of dial plate 180 and includes: a cylindrical exterior wall 188; a forwardly projecting ridge 190 extending laterally across the center of grasping structure 182; and a pair of finger slots or finger cavities 192 formed in the forward face of grasping structure 182 and separated by grasping ridge 190. The transition from the cylindrical exterior wall 188 of grasping structure 182 to circular dial plate 180 forms a radial shoulder 194 which extends around braking dial 24.

Each of cams 186 is operable for interacting with an interacting structure 136. Each cam 186 preferably comprises: a first flat 202 provided at the base/leading end of the cam; a first sloped segment 204; a second flat 206; a second sloped segment 208 ; a third flat 210; a third sloped segment 212; and a fourth flat 222. Each of sloped ramp segments 204, 208, and 212 most preferably has a substantially constant slope.

Braking dial 24 is rotatably held between (a) an internal radial shoulder 216 formed in side over 20 around circular aperture 26 and (b) the outer face 218 of spool cover 144. A thin friction reducing ring 217, washer, or other such element is preferably positioned between the forward radial shoulder 194 of braking dial 24 and the interior radial shoulder 216 of side cover 20. The rearward face of dial plate 180 slidably abuts the outer face 218 of spool cover 144.

Figure 4:
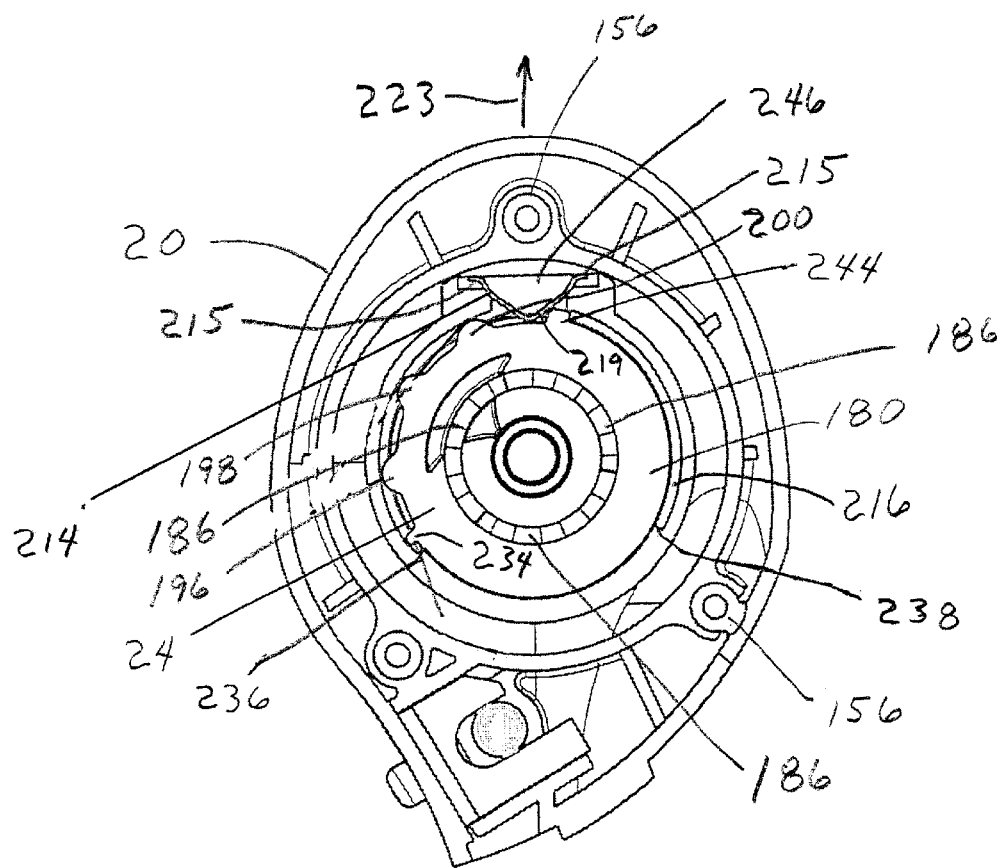
FIG. 4 provides an elevational interior view of the left side cover 20 of reel 2.
Figure 5:
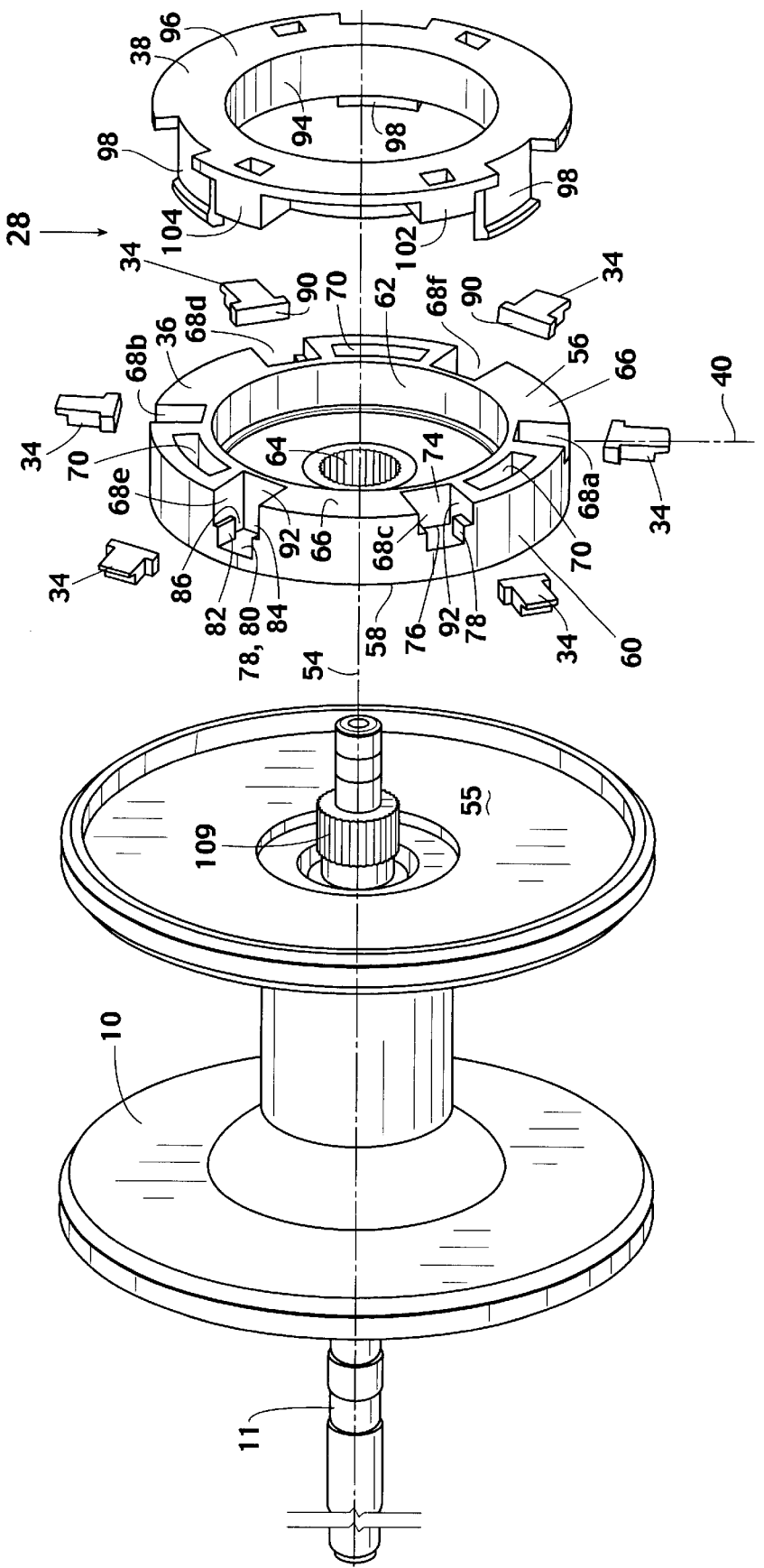
FIG. 5 provides an exploded perspective view of a preferred embodiment of a brake element assembly 28 employed in inventive braking apparatus 1.
Figure 6:
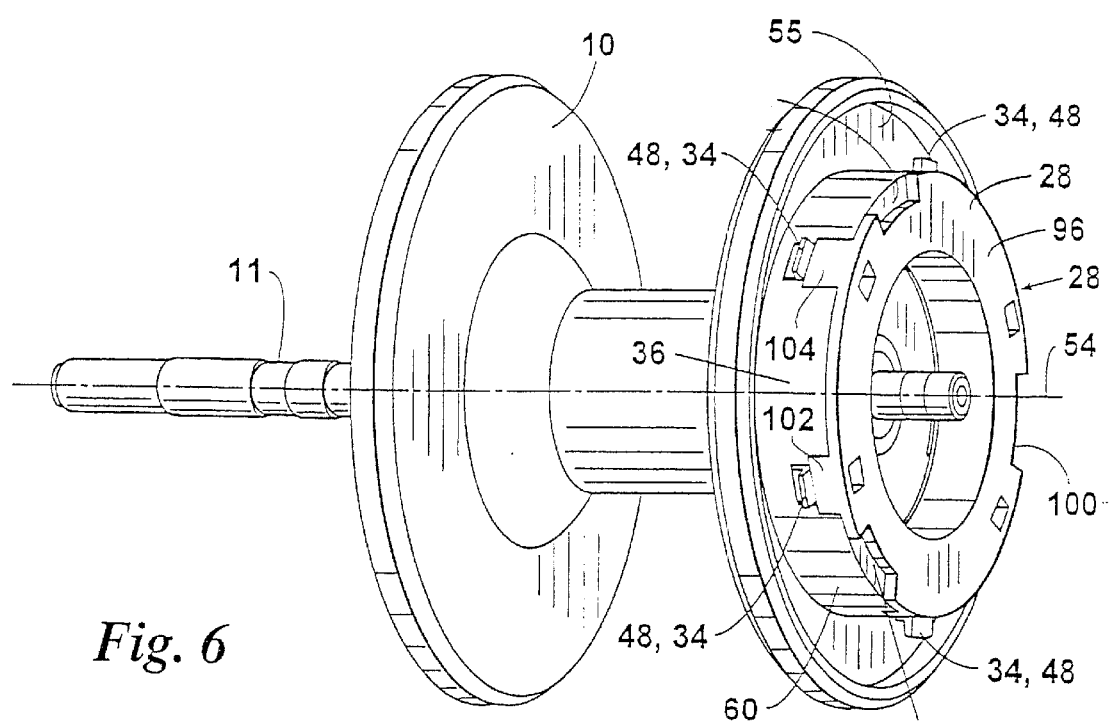
FIG. 6 provides an assembled perspective view of brake element assembly 28.
Figure 7:
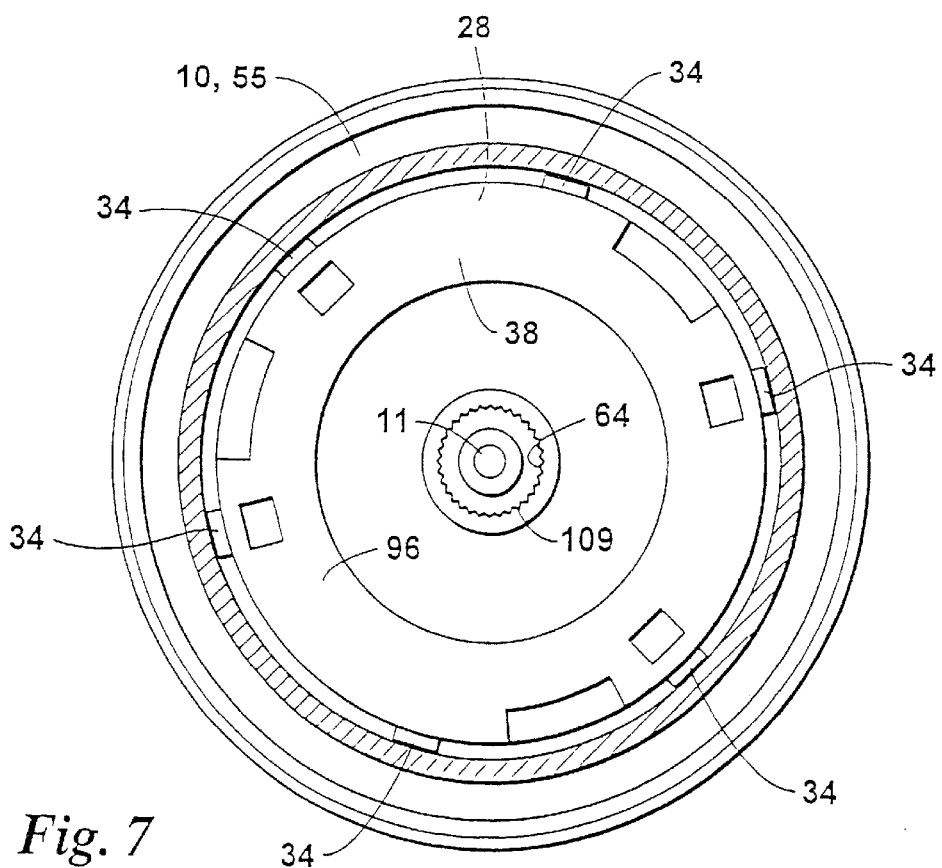
FIG. 7 provides an elevational front view of brake element assembly 28.
Figure 8:
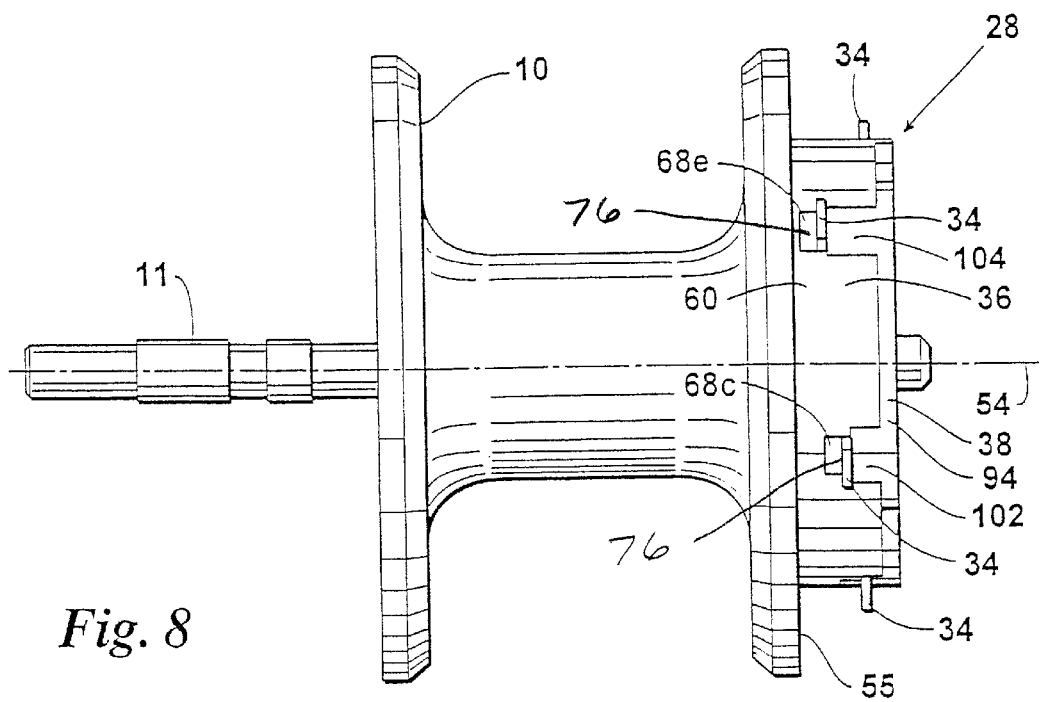
FIG. 8 provides an elevational side view of brake element assembly 28.
Figure 12:
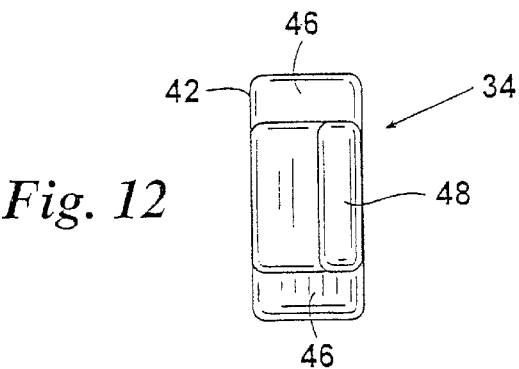
FIG. 12 provides a distal end view of brake element 34.
Figure 9:
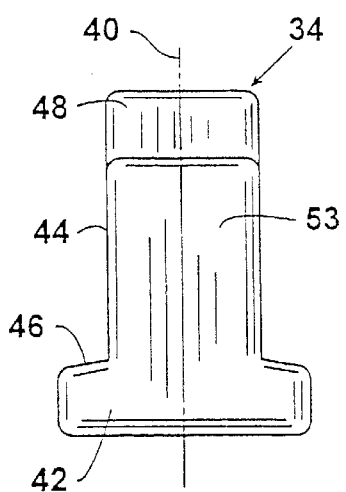
FIG. 9 provides an elevational rear view of a brake element 34 employed in brake element assembly 28.
Figure 10:
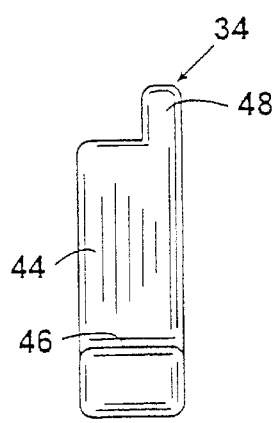
FIG. 10 provides an elevational side view of brake element 34.
Figure 11:
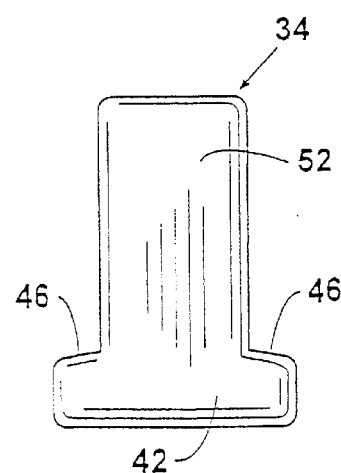
FIG. 11 provides an elevational forward view of brake element 34.
Figure 13:
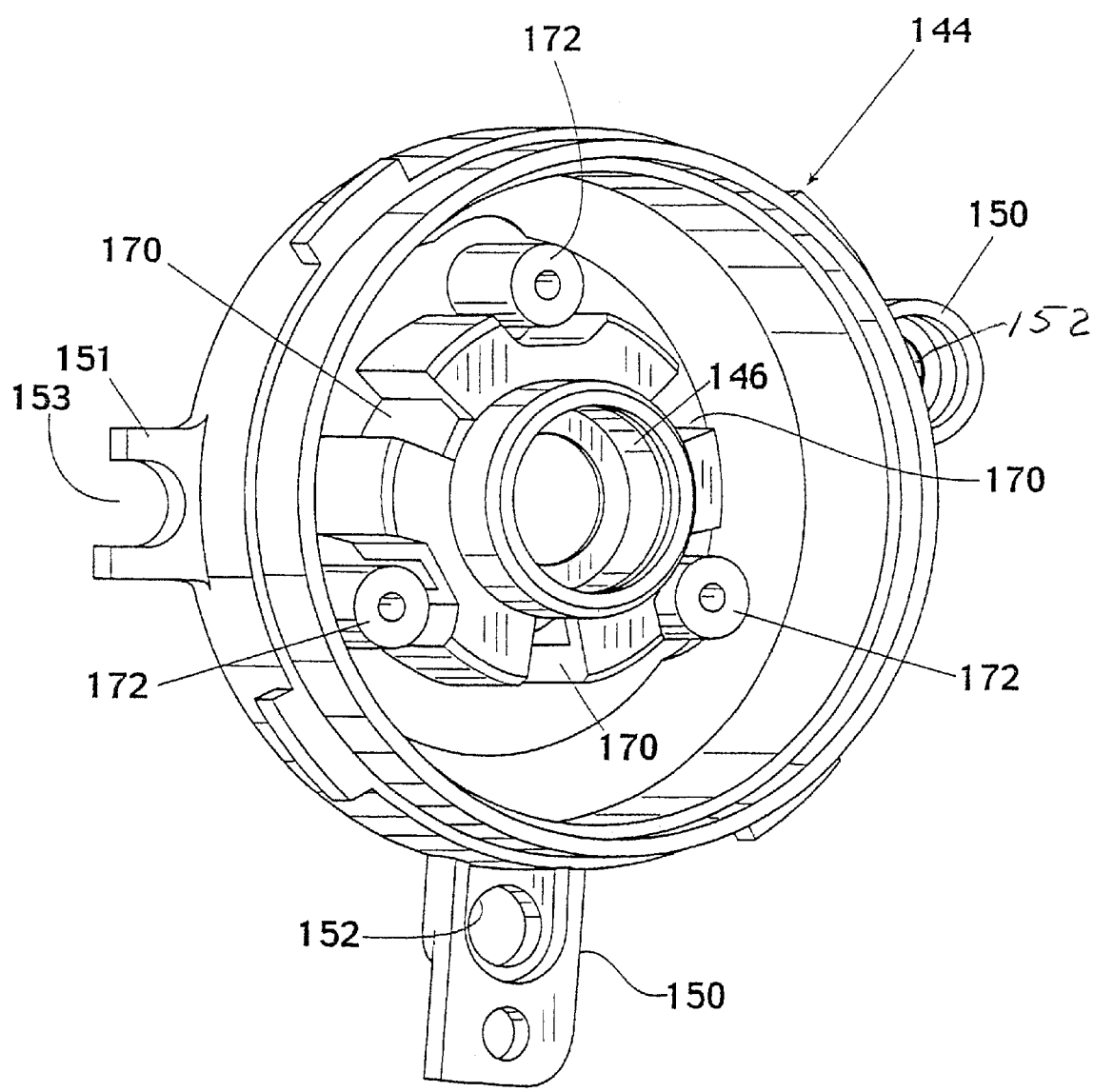
FIG. 13 provides a perspective interior view of spool cover 144.
Figure 14:
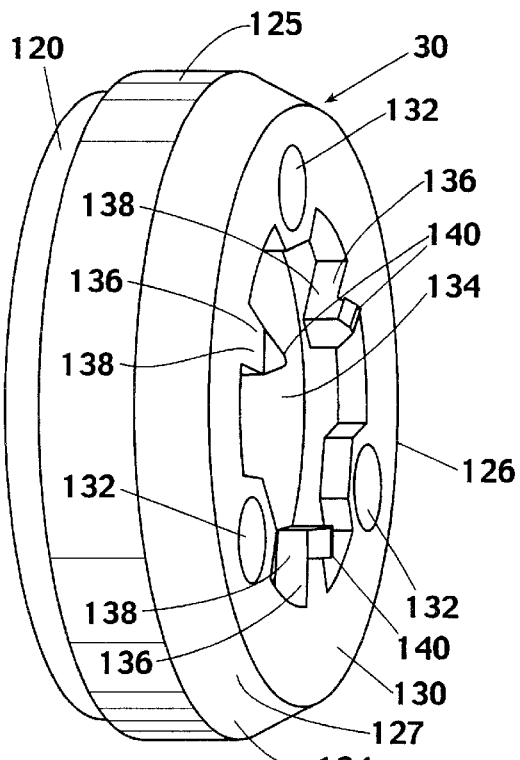
FIG. 14 provides a perspective exterior view of a brake ring assembly 30 employed in inventive braking apparatus 1.
Figure 15:
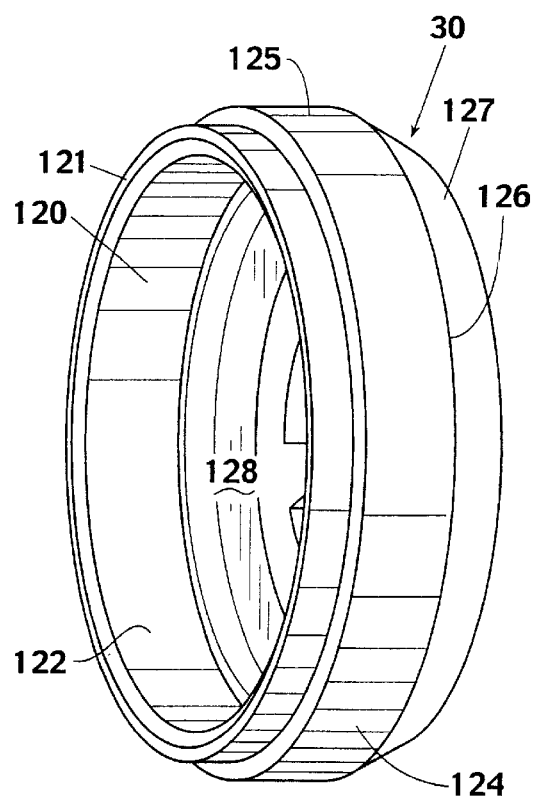
FIG. 15 provides a perspective interior view of brake ring assembly 30.

Inventive braking apparatus 1 further comprises a V-spring (i.e., a substantially V-shaped, U-shaped, or similarly curved spring) 214 retained in a slot 246 formed in side cover 20. Slot 246 has a shape (preferably a T-shape as depicted in FIG. 4) such that the outwardly angled end portions 215 of V-spring 214 are retained in slot 246 but are free to move/flex outwardly. Thus, the curved portion 219 of spring 214 is allowed to flex inwardly (i.e., in the direction indicated by arrow 223) when contacted and pushed (deformed) by dial lobes 196, 198, and 200.

V-spring 214 desirably interacts with cam lobes 196, 198, and 200 such that, whenever the dial 24 is moved in either direction, spring 214 will, if necessary, act against cam lobe 196, 198, or 200 to turn dial 24 slightly such that the leading edge of spring 214 will always be located in one of the valleys 220 created between and/or beside cam lobes 196, 198, and 200. In other words, if the user turns dial 214 to an "in between" position wherein one of the cam lobes 196, 198, and 200 is left in contact with V-spring 214, spring 214 will press and slide against the rounded edge of the cam lobe to produce a rotational force in the direction of the closest valley 220. Due to the shape of V-spring 214, acting in concert with the cam lobes 196, 198, and 200, there is only a very small outermost point on each lobe where the spring 214 is pushing strictly perpendicular to the cam lobe and therefore producing no rotational force. However, at these points, the biasing force of brake assembly springs 174 acts through interacting structures 136 on the cam ramps 186 of dial 24 to cause dial 24 to rotate clockwise.

Figure 16:
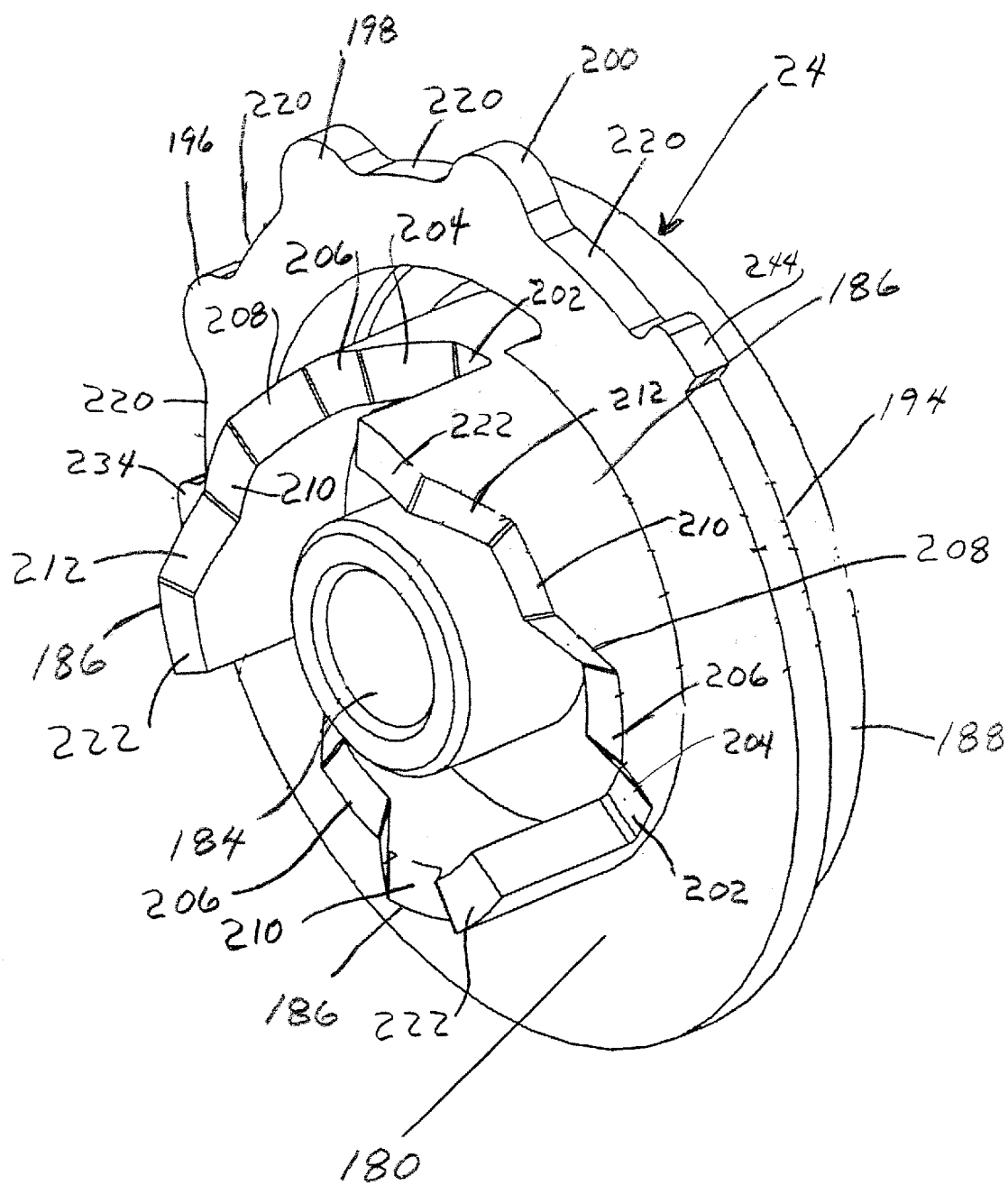
FIG. 16 provides a perspective interior view of a brake dial 24 employed in inventive braking apparatus 1.

The valleys 220 provided between lobes 196, 198, and 200 correspond to specific predetermined braking positions of the braking system. As best seen in FIG. 16, the second cam flats 206 of dial cams 186 are spaced rearwardly from the first cam flats 202, the third cam flats 210 are spaced rearwardly from the second cam flats 206, and the fourth cam flats 222 are spaced rearwardly from the third cam flats 210 such that the cam ramps 186 preferably provide four distinct braking positions corresponding to the four valleys 220 of dial 24. However, cam lobes 196, 198, and 200 and spring 214 could be used to establish specific predetermined braking positions even if, for example, cams 186 were of continuous slope, having no flats provided thereon. As the spring 214 passes over a cam lobe 196, 198, or 200, both an audible noise and a tactile sensation will be produced, thus indicating proper positioning of the dial.

When the inventive apparatus is assembled, springs 174 urge brake collar 124 forward such that the interacting structures 136 of collar 124 are maintained in operable contact with dial cams 186. When the rounded bosses 140 of interacting structures 136 are positioned on first cam flats 202, brake ring assembly 30 preferably is held in a fully forward, non-braking position wherein none of brake elements 34 can contact brake ring 120. As the user turns brake dial 24 counterclockwise, the first sloped segments 204 of cams 186 act against interacting structures 136 to push interacting structures 136 and brake ring assembly 30 rearward. As the interacting structures traverse the first sloped segments 204 of dial cams 186, spring 214 simultaneously traverses the first cam lobe 200. When the interacting structures 136 mate with the second flats 206 of the dial cams 186, the spring 214 will be positioned in the valley 220 between cam lobes 200 and 198, thereby retaining dial 24 and brake ring assembly 30 in an initial braking position 228. As the user continues to rotate dial 24 counterclockwise, the second sloped segments 208 of cams 186 push interacting structures 136 further rearward such that rounded bosses 140 will next be positioned on cam flats 210 with V-spring 214 positioned in the valley 220 between cam lobes 198 and 196, thereby retaining dial 24 and brake ring assembly 30 in an intermediate braking position. Finally, as the user continues to rotate dial 24 counterclockwise, the third sloped segments 212 of cams 186 push interacting structures 136 further rearward such that rounded bosses 140 will next be positioned on cam flats 222 with V-spring 214 positioned in the valley 220 between cam lobe 196 and a tab 234 provided on dial 24, thereby retaining dial 24 and brake ring assembly 30 in a full braking position.

If, in operating dial 24, the user does not squarely position brake dial 24 such that the outermost edge of V-spring 214 is squarely positioned within a valley 220, but rather leaves spring 214 in contact with a portion of a cam lobe 196, 198, or 200, biasing V-spring 214 will act against the curved outer edge of the cam lobe 196, 198, or 200 with sufficient force to automatically turn dial 24 until V-spring 214 is located in the closest valley 220.

Tabs 234 and 244 provided on the outer edge of dial plate 180 operate to limit the rotation of braking dial 24 such that (a) the flats 222 of cams 186 cannot be rotated past interacting structures 136 when turning braking dial 24 counterclockwise and (b) flats 202 cannot be rotated past interacting structures 136 when rotating dial 24 clockwise. The rotational movement of braking dial 24 is limited in the clockwise direction by the abutment of tab 234 with a cover shoulder 236 and is limited in the counter-clockwise direction by the abutment of tab 244 with cover shoulder 238. Shoulders 236 and 238 are provided in the interior of side cover 20. Thus, the inventive braking system cannot be turned past either the above-mentioned "full braking position" or the above-mentioned "non-braking position." The braking position of the inventive apparatus is preferably indicated by an index mark 240 provided on the exterior of braking dial 24. Mark 240 preferably aligns with position arrows 242 or other features provided on the exterior of side cover 20 to indicate the operating position of the inventive braking system.

In embodiment 1 of the inventive braking system, four position arrows are provided, each corresponding to a separate one of the four above-described braking positions. The offset positioning of the brake elements 34 in housing 36 operates in conjunction with the axial movement of brake ring 120 to ensure that different amounts of braking force are provided when the inventive apparatus is moved from one braking position to another. The longitudinal axes 40 of the brake elements 34 contained in slots 68a and 68b lie in a first plane perpendicular to housing axis 54. The longitudinal axes 40 of the brake elements 34 contained in slots 68c and 68d lie in a second plane perpendicular to rotational axis 54. The longitudinal axes 40 of the brake elements 34 contained in slots 68e and 68f lie in a third plane perpendicular to rotational axis 54. Due to differing depths of slots 68a–f, the second plane is spaced rearwardly from the first plane and the third plane is, in turn, spaced rearwardly from the second plane. When brake ring 120 is placed in the above-mentioned "non-braking position," none of brake elements 34 can contact braking surface 122. The above-mentioned "initial braking position," on the other hand, constitutes a minimal brake setting wherein brake ring 120 encompasses only the brake elements 34 contained in housing slots 68a and 68b. The above-mentioned "intermediate braking position" provides an intermediate setting wherein brake ring 120 encompasses the brake elements 34 contained in slots 68a, 68b, 68c, and 68d. Finally, when placed in the above-mentioned "full braking position," brake ring 120 encompasses, and can be contacted by, all of brake elements 34.

The inventive system ensures that brake ring 120 is always maintained in selected, consistent, predetermined braking positions. Thus, brake elements 34 will not bind against the rearward edge 121 of brake ring 120 but will always be maintained in proper position (contacting or noncontacting) with respect to braking surface 122. Further, the user will always know what the position of the system is and will know the relative degree of braking force being applied.

As will be understood by those skilled in the art, although embodiment 1 of the inventive apparatus utilizes three cams 186 and three corresponding interacting structures 136, the inventive apparatus could optionally utilize one, two, three, or more cams 186. Further, although the cams 186 of embodiment 1 provide flat areas corresponding to the discrete braking positions provided by valleys 220, cams of constant slope or cams of varying slope could also be used. Moreover, although embodiment 1 provides four specific brake settings, generally any number of settings could be used. The inventive apparatus will preferably provide at least two braking positions.

As will be understood by those skilled in the art, although the above-described embodiment 1 of the inventive apparatus involves a centrifugal braking assembly 28, other types of braking assemblies (e.g., a magnetic braking assembly or a centrifugal braking assembly using radially extending rods having braking weights, pads, and/or bristles slidably mounted thereon) could be employed in the present invention.

As will be further understood by those skilled in the art, equivalent operation and feel of the brake dial 24 could be achieved by forming cam lobes 196, 198, and 200 on or inside the side cover 20 in an arc about and concentric with cover aperture 26. V-spring 241 could then be located on brake dial 24 such that V-spring 241 rotates with dial 24 for interaction with stationary cam lobes 196, 198, and 200.

It will be further understood by those skilled in the art that the inventive apparatus can be employed in generally any type of baitcasting reel.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A spool braking system for a fishing reel comprising:
   an adjustable brake assembly comprising:
      an adjustable brake; and
      an interacting structure for adjustment of said brake;
   a brake dial having a plurality of predetermined positions, and including:
      at least one cam lobe; and
      at least one cam ramp for interaction with said interacting structure, said cam ramp having a plurality of flats thereon, each of said flats corresponding to a particular predetermined position of said plurality of predetermined positions;
   a V-spring operably positioned in the fishing reel for interaction with said cam lobe such that, when said V-spring is positioned against a portion of said cam lobe and said brake dial is not located in one of said predetermined positions, said V-spring will apply a force to said portion of said cam lobe urging said brake dial to rotate to one of said predetermined positions.

2. The spool braking system of claim 1 wherein said adjustable brake comprises a centrifugal brake.

3. The spool braking system of claim 2 wherein said interacting structure comprises a movable brake ring, said brake ring interacting with said cam ramp such that said brake ring moves in response to rotation of said brake dial and said centrifugal brake further comprises a plurality of brake elements for contacting said brake ring to generate a braking force, wherein said brake ring moves relative to said brake elements such that the number of said brake elements which can contact said brake ring will vary as said brake ring moves in response to rotation of said brake dial.

4. The spool braking system of claim 3 wherein said plurality of predetermined positions include:
   a noncontacting position wherein, when said brake dial is in said noncontacting position, said brake ring will move to a position where none of said brake elements can contact said brake ring, and
   at least one contacting position wherein, when said brake dial is in said at least one contacting position, said brake ring will move to a position where at least one of said brake elements can contact said brake ring.

5. The spool braking system of claim 1 further comprising an indicating means for indicating each predetermined position of said plurality of predetermined positions.

6. A self-positioning adjustment mechanism for an adjustable brake on a fishing reel comprising:
   a side cover;
   a brake dial rotatably positioned in said side cover such that said brake dial is externally accessible and operable from outside of said side cover, said brake dial having a plurality of predetermined positions and said brake dial including at least one cam ramp having a plurality of flats thereon, each of said flats corresponding to a particular predetermined position of said plurality of predetermined positions;
   at least one cam lobe provided on one of said brake dial and said side cover; and
   a V-spring operably attached to the other of said brake dial and said side cover for interaction with said cam lobe such that, when said V-spring is positioned against a portion of said cam lobe and said brake dial is not located in one of said predetermined positions, said V-spring will act against said portion of said cam lobe to urge said brake dial to rotate to one of said predetermined positions.

7. The self-positioning adjustment mechanism of claim 6 further comprising:
   a movable brake ring in operable communication with said brake dial, said brake ring interacting with said cam ramp such that said brake ring moves in response to rotation of said brake dial; and
   wherein the braking force provided by the adjustable brake varies with movement of said brake ring.

8. The braking apparatus of claim 6 further comprising an indicating means for indicating each predetermined position of said plurality of predetermined positions.

9. A brake dial for an adjustable spool brake on a baitcast fishing reel comprising:
   a dial plate including:
      a first surface accessible from outside the side cover;
      a second surface;
      an outer edge;
   a plurality of cam lobes provided on said outer edge;
   at least one cam ramp projecting from said second surface, said cam ramp having a plurality flats thereon; and
   a grasping structure projecting from said first surface.

* * * * *